July 18, 1933.  A. H. DOLGE  1,919,103
CHURCH TRUCK
Filed June 18, 1932  3 Sheets-Sheet 3
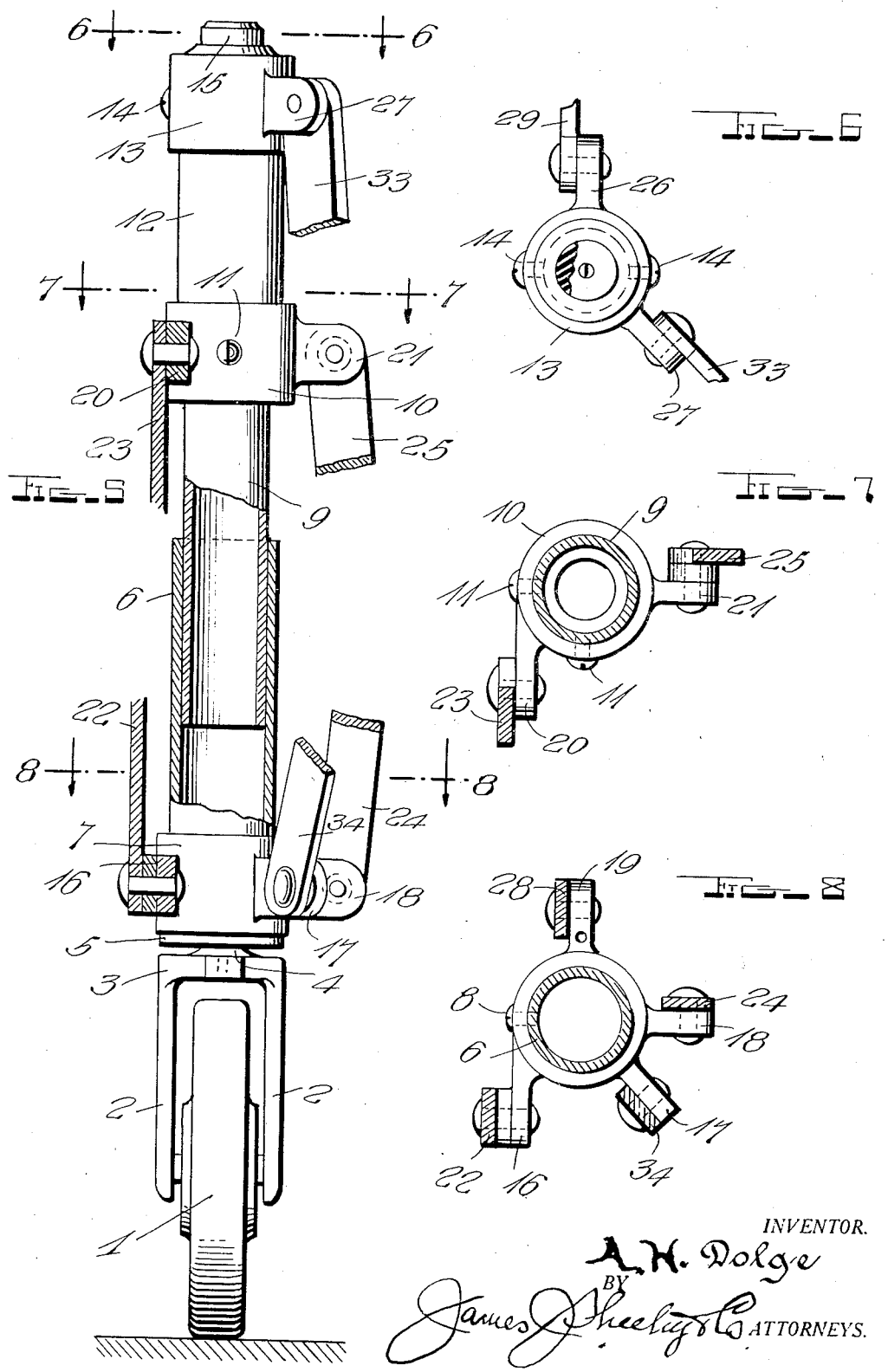

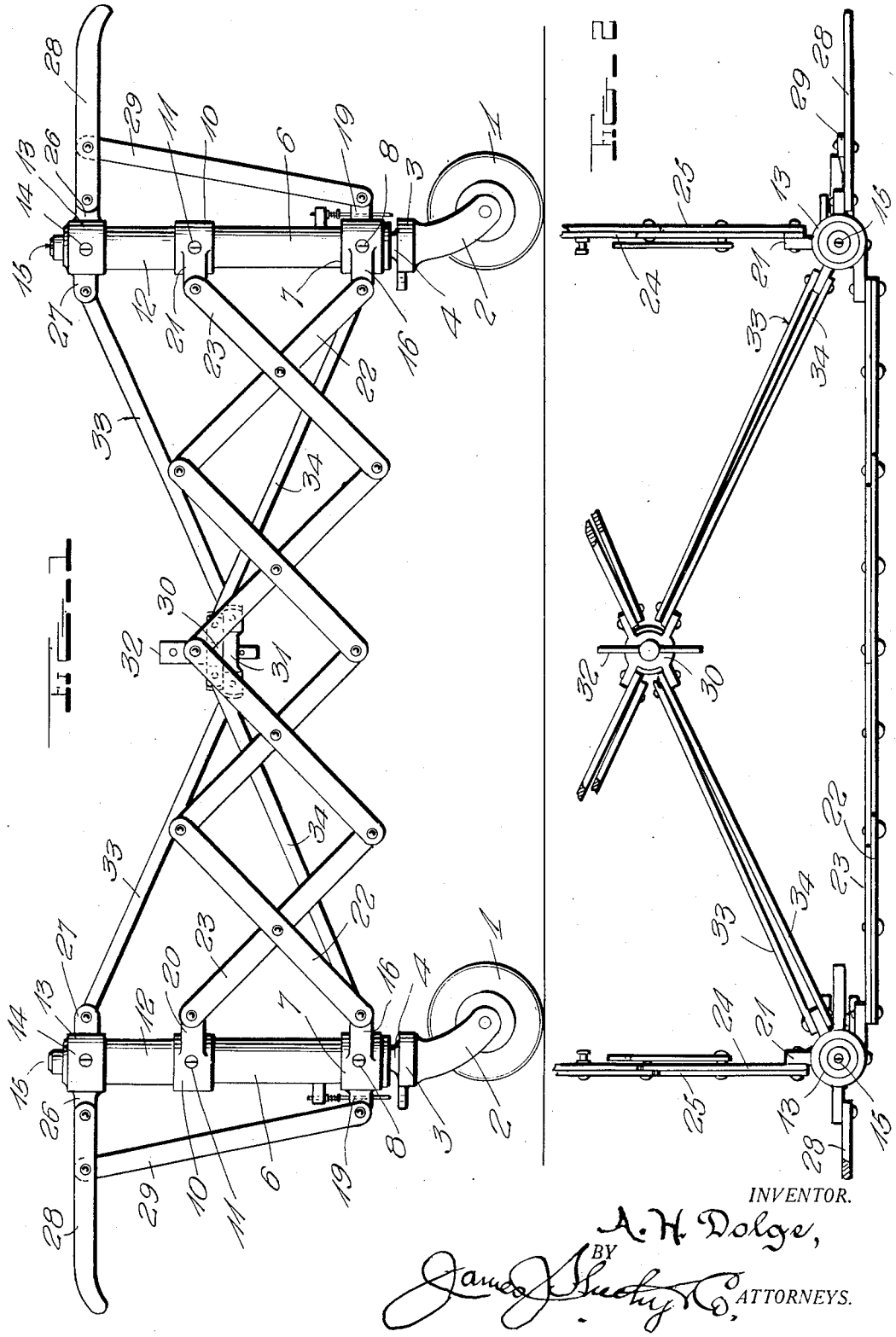

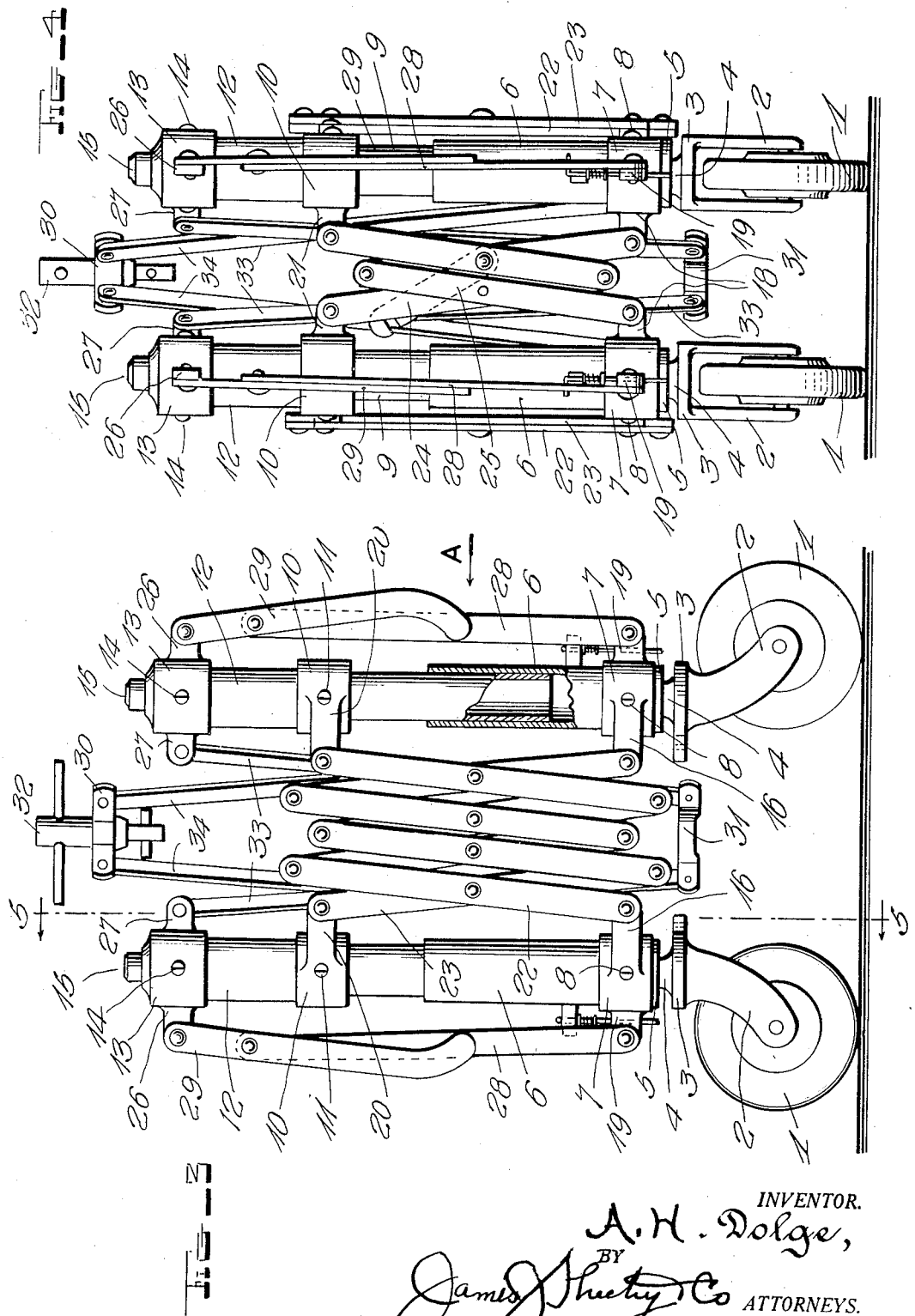

Patented July 18, 1933

1,919,103

UNITED STATES PATENT OFFICE

ARTHUR H. DOLGE, OF WESTPORT, CONNECTICUT

CHURCH TRUCK

Application filed June 18, 1932. Serial No. 618,041.

My present invention pertains to church trucks viz casket trucks, such for instance, as are employed by undertakers and the like, and it contemplates the provision of a portable truck that is readily and easily folded into a small and compact device and as readily and easily extended into its working position and when so extended will conveniently lock and be retained in such extended position regardless of the amount of weight imposed upon the truck.

The invention further contemplates the provision of re-enforcing collars in a church truck that may be easily and conveniently locked with regard to the standards thereof.

Other objects of the invention will be fully understood from the following description and claim when the same are read in connection with drawings accompanying and forming part of this specification, in which Figure 1 is a side elevation of my novel church truck in its extended or working position.

Figure 2 is a fragmentary view illustrating the device in its working position.

Figure 3 is a side elevation of the truck in closed or collapsed position.

Figure 4 is an end elevation illustrating the device in its closed or collapsed position.

Figure 5 is a transverse vertical section taken in the plane indicated by the line 5—5 of Figure 3.

Figures 6, 7 and 8 are horizontal sections taken in the planes indicated by the lines 6—6, 7—7 and 8—8 respectively of Figure 5.

Similar numerals of reference designate corresponding parts in all the views of the drawings.

The wheels 1 are mounted in bifurcated portions 2 that are provided at their upper ends with heads 3 that terminate in trunnions 4 pivoted in ball bearings (not illustrated) and arranged above the trunnions are ball bearing collars 5 that in turn are mounted below the collars 7 adjustably secured by set screws 8 on a male hollow standard 6.

The standards 6 are adapted to receive the female standards 9 that are provided with collar 10 adjustably secured to the standards 9 by means of the set screws 11.

Mounted above the collars 10 are barrels 12 that carry the collars 13 adjustably mounted on the barrels 12 by means of the set screws 14 and arranged in the upper end of the collars 13 are rubber feet 15.

My novel device particularly pertains to the construction now about to be described and comprises the manner in which rigidity of the truck is increased by the novel manner in which the braces and lazy tongs of the truck are braced and hinged with respect to the collars of the standards.

The construction clearly shows the collars 7 at the lower end of the standards that are provided each with sets of ears 16, 17, 18 and 19 while the upper collars 11 are provided with the ears 20 and 21. Secured to the ears 16 of the collar 7 and in hinged relation are lazy tong bars 22 while the ears 21 and 20 of the collars 10 hingedly engaged the lazy tong bars 23. These lazy tong members are the long or side tongs while the end or short lazy tong members are indicated by 24 and 25. These lazy tong members 24 and 25 are engaged by the ears 21, Figure 2. The upper collar 13 is also provided with ears 26 and 27; the ears 26 having hinged thereto handle bars 28 that in turn engage the depending bars 29 that are hinged at their lower ends to the ears 19 of the collar 7. The upper bar ears 27 hingedly engage the bars 33 while at 34 I provide the bars that engage ears 18 of the collar 7 as clearly illustrated in Figure 5.

Arranged in the bars 33 and 34 at the inner end thereof is a locking device 32 that comprises the heads 30 and 31. When the truck is in its inoperative position head 31 of the bars 33 is in a plane approximately that of the heads 3 of the bifurcated portions 2 while the head 30 of the bars 34 is slightly higher than the feet 15 of the collars 13. When the truck is in its operative position these heads are moved toward each other and abut one another and the locking device is turned by means of its handle clockwise whereby the pin at the lower end of the locking device will be at right angles to the position shown in Figure 3 so that it rests firmly under the head 31 thereby securely holding the heads 30 and 31 to each other and the truck as a whole in locked position.

It will be gathered from the foregoing that the operator in manipulating the device merely places it anywhere in collapsed position and then by merely pushing downward on the locking device 32 the heads 30 and 31 are forced against and abut with respect to each to the position shown in Figure 1 and then by merely turning the handle of the locking device until the cross bar of the device is cross-way of the lower head 31 the entire device is securely locked and collapse of the truck is precluded.

Particular attention is invited to the fact that my novel truck is advantageous over the prior art because the length and width of the truck is adjustable. In other words when a small casket is to be carried on a truck adjustment of the collars with respect to the posts near the upper ends of the posts will shorten the movement of the lazy tong bars whereas adjustment of the collars by means of the set screws near the lower ends of the posts will increase the length and width of the truck.

What I claim:

A church truck comprising wheels, bifurcations adapted to engage the wheels, collars arranged above the bifurcations, posts to which collars are adjustably secured, ears formed on the collars, end and side lazy tong bars secured to the collars, other posts adapted to enter in telescopic manner the first post, adjustable collars mounted on the second posts, ears formed on the second collars, lazy tong bars secured to the sides and ends of the collars, other collars adjustably mounted on the upper end of the second posts, feet mounted in the last named collars, bars secured to the outwardly extending bars and hinged thereto and secured to the first collars and a locking device arranged within the bars of the last collars and a handle rigidly securing the locking device to prevent collapse of the truck in extended position.

ARTHUR H. DOLGE.